United States Patent [19]

Sakami et al.

[11] 4,315,332
[45] Feb. 9, 1982

[54] ELECTRONIC TIMEPIECE RADIO

[75] Inventors: Ryoichiro Sakami; Yoshihiko Hirayama, both of Tokyo, Japan

[73] Assignee: Kabushiki Kaisha Daini Seikosha, Tokyo, Japan

[21] Appl. No.: 138,299

[22] Filed: Apr. 8, 1980

[30] Foreign Application Priority Data

Apr. 13, 1979 [JP] Japan .................. 54-45123

[51] Int. Cl.³ .................. H04B 1/16; G04C 11/02
[52] U.S. Cl. .................. 455/181; 455/231; 455/344; 368/47
[58] Field of Search .............. 455/230, 231, 140, 141, 455/181, 344, 345, 66, 51; 340/147 SY, 309.1, 309.4; 368/47, 52, 53, 55

[56] References Cited

U.S. PATENT DOCUMENTS

| 1,869,175 | 7/1932 | Sprague | 368/47 |
| 2,005,158 | 6/1935 | Nicolson | 368/47 |
| 3,323,025 | 3/1967 | Sugano | 455/231 |
| 4,023,344 | 5/1977 | Mukaiyama | 368/47 |
| 4,135,158 | 1/1979 | Parmet | 455/231 |
| 4,204,167 | 5/1980 | Liu | 455/231 |

FOREIGN PATENT DOCUMENTS 1487955 10/1977 United Kingdom .................. 368/47

*Primary Examiner*—Joseph A. Orsino, Jr.
*Assistant Examiner*—Tommy P. Chin
*Attorney, Agent, or Firm*—Robert E. Burns; Emmanuel J. Lobato; Bruce L. Adams

[57] ABSTRACT

Disclosed is an electronic timepiece radio having an electronic timepiece circuit, a circuit for detecting a time signal and correcting the time indication of the electronic timepiece by the detected time signal.

And a preset system receiving circuit can receive more than two preset broadcasting stations.

And a receiving frequency in the receiving circuit can be automatically set at the frequency of a specified preset station little before a time correction by a time signal is carried out at the receiving of the time signal whereby time indication is automatically corrected every day.

5 Claims, 3 Drawing Figures

ELECTRONIC TIMEPIECE RADIO

BACKGROUND OF THE INVENTION

The present invention relates to an electronic timepiece radio in which the time indication is corrected by a time signal in the radio broadcasting and the radio programs can be received.

Recently, miniaturization of electronic equipment has made remarkable progress, and smaller radio receivers are developed year after year. For example, a small and preset radio set can be realized by exchanging a variable condenser occupying a large volume in the radio set for a variable capacitance diode and potentiometer, and moreover, employing the frequency synthesizing technique makes it possible to miniaturize it to obtain a high performance radio set using integrated circuits. As a result, the size of a radio gradually becomes small enough for incorporating into a watch. On the other hand, with the requirement of the various functions, a compound product having more than two functions, such as the combination of a timepiece and radio, has been on sale.

In the conventional compound product of a timepiece and radio, a miniaturized radio set and a timepiece are simply incorporated into one housing, so that each of the two functions are perfectly independent. Therefore, if the time indicated by the timepiece is not perfectly coincident with the time signal when the radio broadcasting is received, the reliability for the accuracy of the timepiece will be extremely impaired. In addition, stations other than the station of the Broadcasting Corporation of Japan (NHK) sometimes omit to broadcast the time signal. Therefore, when a person having a timepiece radio does not listen to the Broadcasting Corporation of Japan, the time correcting operation by receiving the time signal may not be carried out.

SUMMARY OF THE INVENTION

It is an object of the present invention to provide a high accuracy timepiece in which the time can be surely corrected by the time signal and to increase the kind of the timepiece-specifications by the addition of the radio set.

It is another object of the present invention to provide an electronic timepiece radio comprising an electronic timepiece circuit, a circuit for detecting a time signal and correcting a time by a time signal, and a preset system receiving circuit which can receive more than two stations set in advance.

DETAILED DESCRIPTION OF THE INVENTION

The present invention will now be described in conjunction with FIG. 1.

Figure 1:
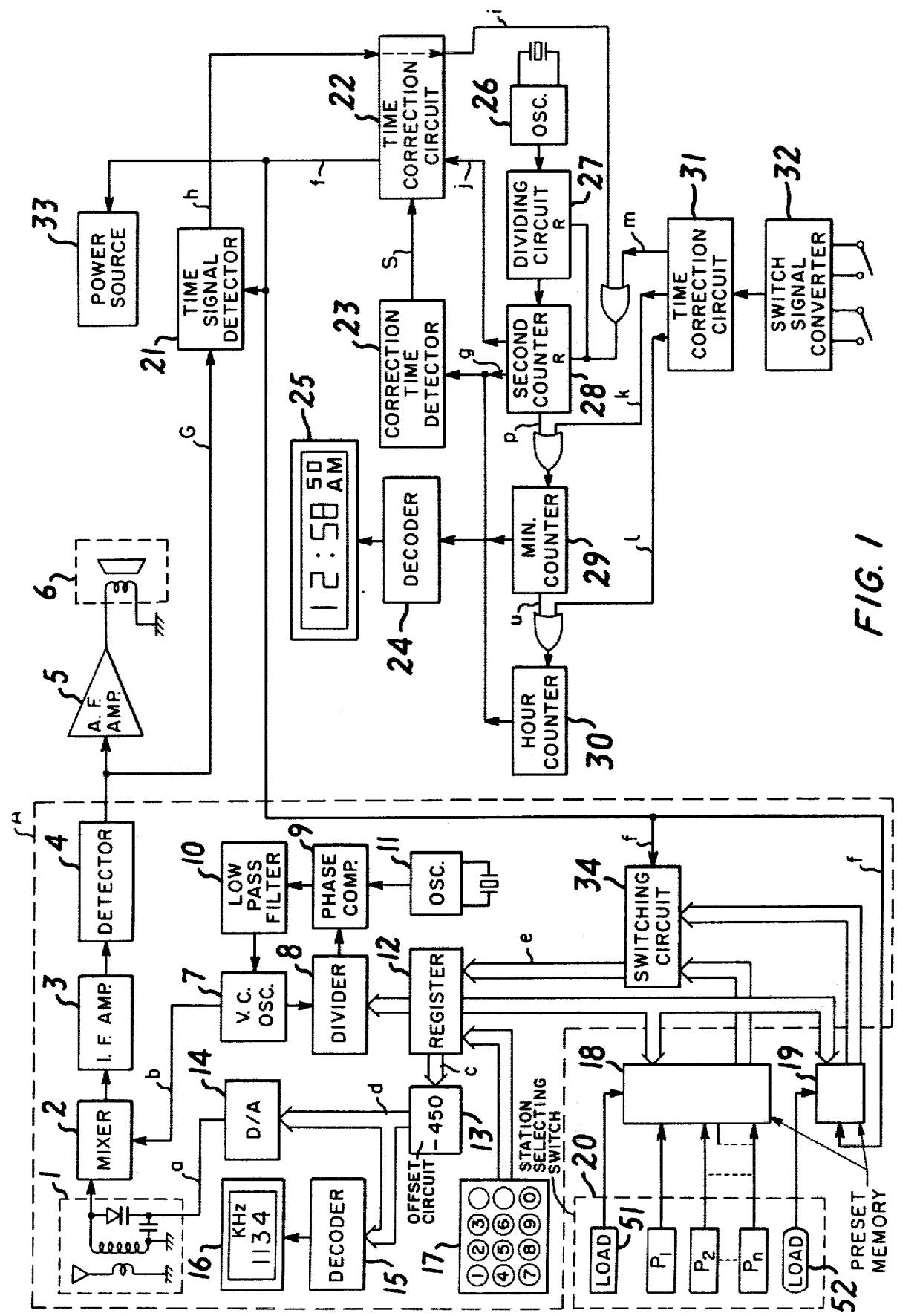
FIG. 1 is a block diagram of one embodiment of the present invention.

FIG. 1 is a block diagram of one embodiment of the present invention. At first, the arrangement and the operation of a receiving circuit section will be described. A tuning circuit 1 carries out the selection of the various radio frequency signals applied from an antena. A mixer 2 is for converting the radio frequency into an intermediate frequency, and 3 is an intermediate frequency amplifier for amplifying the converted intermediate frequency signal. A detector 4 detects the intermediate frequency signal to obtain an audio signal. An audio amplifier 5 receives the audio signal for amplifying the audio signal to drive a speaker 6. Reference numeral 7 indicates a voltage controlled oscillator the frequency of which is controlled in accordance with a voltage from a low pass filter 10. The output from the voltage controlled oscillator 7 acting as a local oscillator is supplied to the mixer 2, and the output is also supplied to a programmable divider 8 to be divided in frequency in accordance with a dividing ratio that is determined by a register 12 for setting a dividing ratio. Numeral 11 represents a standard signal oscillator, 9 a phase comparator, and 10 a low pass filter. The phase comparator detects the phase difference between the output from the standard signal oscillator and the output from the programmable divider 8 to produce a signal having a pulse width corresponding to the phase difference. The low pass filter converts the magnitude of the pulse width into the magnitude of a voltage corresponding thereto, and the frequency and the phase of the signal from the voltage controlled oscillator 7 are controlled by the signal from the low pass filter. An offset circuit 13 is the circuit in which a signal indicating a result number of the subtracting the frequency corresponding to the setting number in the register 12 from the intermediate frequency, that is, a signal indicating a number corresponding to the receiving frequency, is produced. A decoder 15 acts as a code converter and a frequency indicator 16 indicates the frequency being received.

When a key-in operation for inputting a receiving frequency or a dividing ratio of the programmable divider 8 is carried out by the use of a keyboard 17, the rewrite operation for the content in the register 12 can be carried out. A preset memory 18 can memorize the dividing ratios for any n station, and these dividing ratios for the programmable divider 8 are determined so as to correspond to the receiving frequencies for the radio stations whose broadcast signals are to be received. A station selecting switch 20 has n switches $P_1$ to $P_n$ corresponding to the presetting contents for the n stations in the preset memory 18. When any one switch of the station selecting switches $P_1$ to $P_n$ is operated, the memory content for the station corresponding thereto is read out from the preset memory 18 and the register 12 is set through a switching circuit 34. The preset operation should be carried out by the combination of a load switch 51 and one of the switches $P_1$ to $P_n$ in the station selecting switch 20, and the content in the register 12, namely, the content corresponds to the preset receiving station, is stored in accordance with the address designated by any one of the switches $P_1$ to $P_n$.

A preset memory 19 stores a frequency of the station broadcasting the time signals, for example, the Broadcasting Corporation of Japan. When the signal level of a signal path or line f in FIG. 1 is "1", the read-out operation is carried out to set the register 12 through a switching circuit 34. Element 52 is a load key having a switch construction which can not easily be operated from outside of the timepiece, and the load key is used for presetting the preset memory 19. In addition, these preset memories 18 and 19 are C-MOS type integrated circuits respectively regardless of the switch of radio, the power is always supplied to the preset memories due to the memory operation of the preset frequencies.

Now the arrangement and operation of an electronic timepiece circuit will be described.

The output from a standard signal oscillator 26 is converted into an alternating current signal of 1 Hz by a frequency dividing circuit 27. A second counter 28 is set by the output (i) from a time correction controlling circuit 22 and the output (m) from a time correction circuit 31. Circuit 32 is a switch signal converter and the time correction circuit 31 corrects the time on the basis of signals $S_1$ and $S_2$. The time correction operation is carried out when positive pulses appear on the lines k, l and m, and the adding operation is carried out in an hour counter 30 and a minute counter 29 by adding increments of one. The second counter 28 and the frequency dividing circuit 27 are reset at the second correcting operation. The carry signal p from the second counter 28 is a one minute signal which is applied to the minute counter 29 after synthesizing with a minute correction signal (k) by the use of an OR gate. The carry signal u from the minute counter is a one hour signal which is applied to the hour counter 30 after synthesizing with an hour correction signal (l) by the use of an OR gate. The outputs from each stage in the second counter 28, the minute counter 29 and the hour counter 30 are applied to a decoder 24 and a correction time detector 23. The decoder 24 converts the signal from the stages of the counter, and a time in response to the decoder output signal indicator 25 indicates the time. The correction time detector 23 detects a time little before the time a for the correction, for example, ten seconds to zero o'clock and the signal from the detector 23 is applied to the time correction circuit 22.

The output f from the time correction circuit 22 is used for controllig a power source and the receiving circuit, and 21 is a time signal detector which resets the second counter 28 and the frequency dividing circuit 27 through the time correction circuit 22.

The blocks of the time signal detector 21, the power source 33, the time correction controlling circuit 22 and the second counter 28 will be hereinafter described in conjunction with FIGS. 2 and 3. When the correction time detector 23 detects a time a little before the correction time, for example, ten seconds to zero o'clock, on the basis of the output condition of the second counter 28, the minute counter 29 and the hour counter 30, the signal level of the circuit path S becomes "1" for more than one second but within ten seconds. At this time, the level condition or state of R-S flip-flop in the time correction circuit 22 is inverted and the counting operation of a twenty-seconds counter comprising a pair of internal flip-flops is started. A ten-seconds signal from the second counter 28 is applied to an input j of the twenty-seconds counter and the signal level of the circuit path r becomes "1" after twenty seconds. As a result, the level of the circuit path f becomes "1" for twenty seconds a round the correction time, i.e., twelve o'clock. A voltage at X point in the power source is supplied to the timepiece circuit and the preset memories 18 and 19 having C-MOS construction, a voltage at y point therein is supplied to the receiving circuit A in FIG. 1 and a voltage at Z point is supplied to the audio amplifier 5, respectively. Although electric power is supplied to all of the circuit when a switch SW in the power source 33 is closed, the receiving circuit (indicated by mark A) is in inoperable condition when the radio set is turned off, that is, the switch SW is opened.

However, electric power is supplied to the y point to operate the receiving circuit when the level of the point f becomes "1", regardless of the on/off condition of the switch SW.

Figure 2:
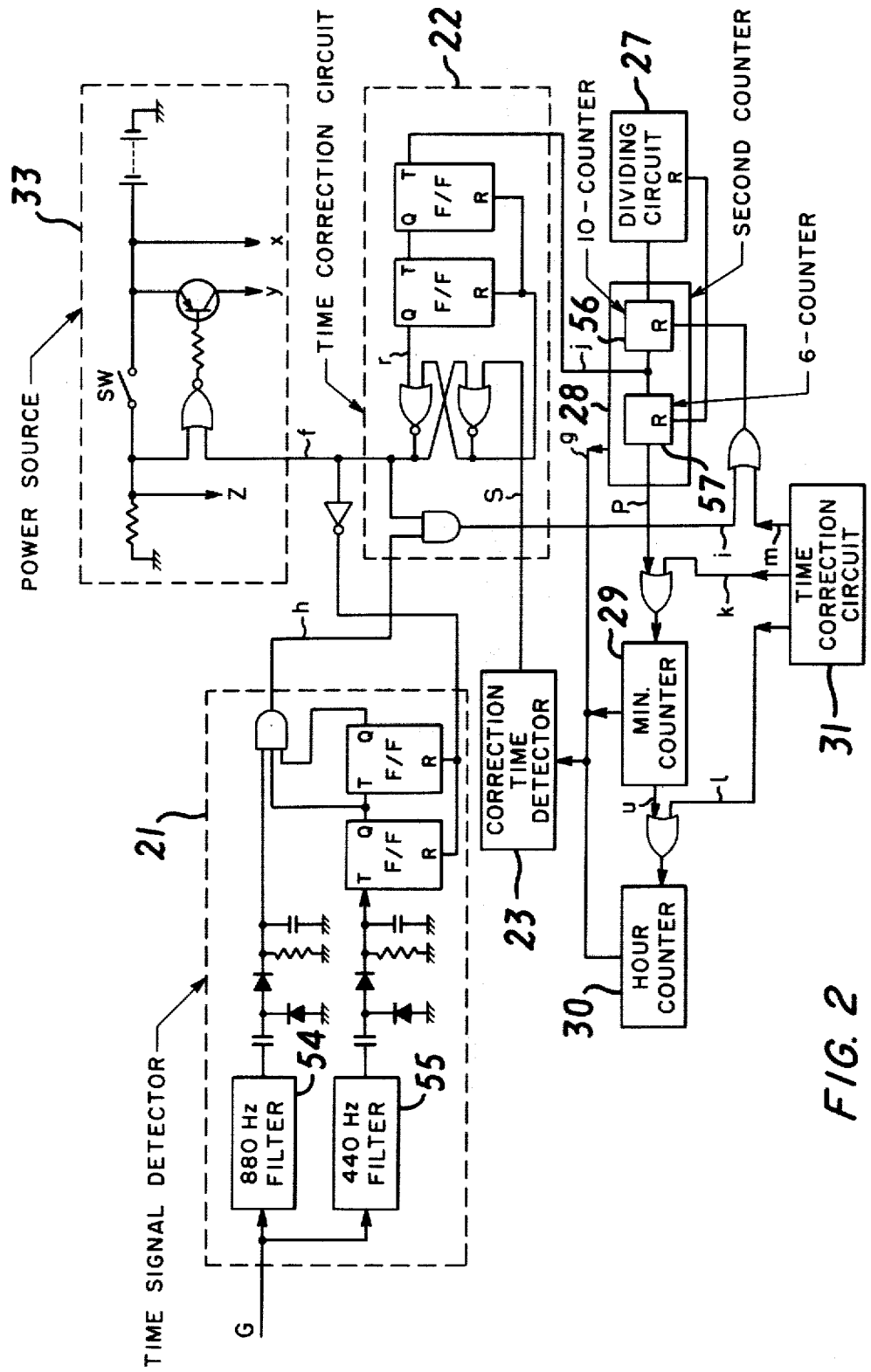
FIG. 2 is a circuit diagram of a time signal detector, a power source and a time correction circuit; and, FIG. 3 is a circuit diagram of a 6-counter.

The time signal detector 21 detects the time signal on the circuit path G of the output of the receiving circuit, and the circuit shown in FIG. 2 is the embodiment adaptable to the time signal pattern with three signals of 440 Hz before zero minute and one signal of 880 Hz at zero minute. The signal of 440 Hz is passed through the filter 55 of 440 Hz and the envelope signal obtained from the circuit connected to the output of the filter 55 is applied to a flip-flop in the time signal detector 21 as a clock signal. The flip-flops in the time signal detector 21 start the counting operation when the signal level of the circuit path f is "1", and the output levels of two flip-flops become "1" when three signals of 440 Hz are applied thereto. Then a "1" level signal is applied to a three-input AND gate through a filter 54 of 880 Hz when the signal of 880 Hz is applied to the circuit path G, and the signal level of the signal path becomes "1". As the signal level of the circuit path f is "1", the level of an output i of a two-input AND gate becomes "1" to reset the second counter 28 and the frequency dividing circuit 27 and the zero second correction will be attained. A 10-counter 56 in the second counter 28 divides in frequency the output from the frequency dividing circuit 27, that is, the one second signal, to produce the ten seconds signal j, as shown in FIG. 2.

Figure 3:
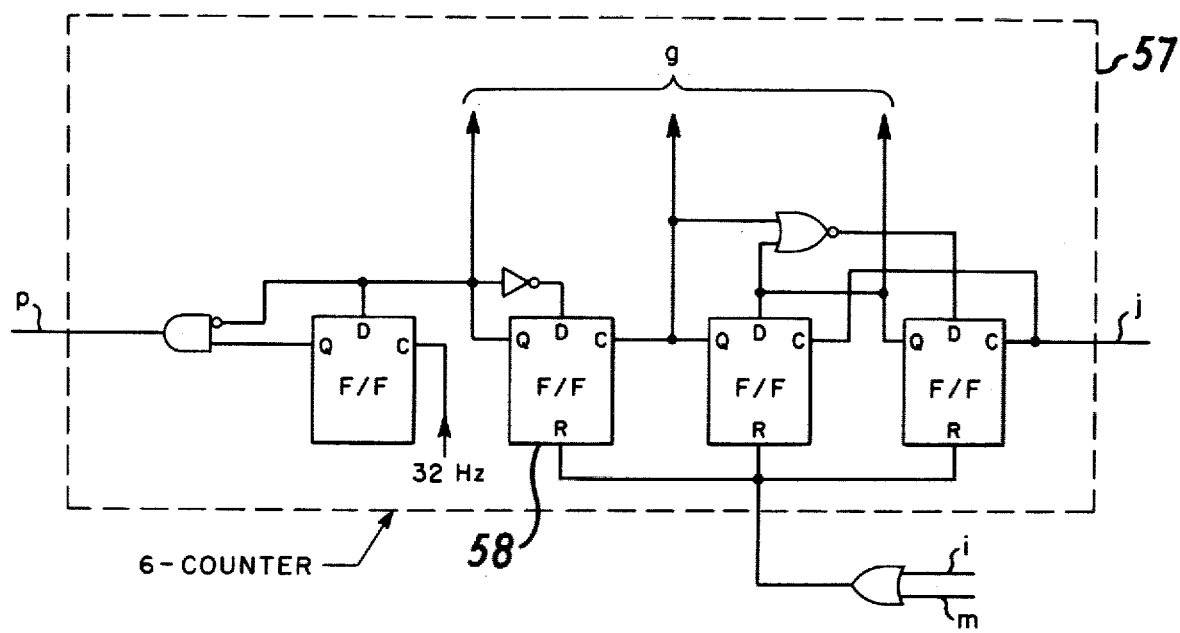

The arrangement of a 6-counter 57 to which the ten second signal j is applied to produce the carry signal p as the one minute signal, is illustrated in FIG. 3. The signal p can be also produced by carrying out the reset operation when the Q level of the flip-flop 58 is "1". Therefore, the content of the minute counter 29 is advanced by 1 by the reset operation when the count of the second counter 28 is more than thirty seconds.

The operation of the system shown in FIG. 1 will be described. First, the operation in which time correction is carried out by a receiving broadcast signal will be explained. Since the frequency interval of the station is 9 KHz, the frequency of the output from the standard signal oscillator 11 is a multiple 1/n (where n is integral) of 9 KHz. The assumption is made that the frequency of the signal from the standard signal oscillator 11 is 9 KHz and the intermediate frequency is 450 KHz. Assuming that a radio station having a frequency of 1242 KHz is received, for example, the dividing ratio of the programmable divider 8, that is, the number set in the register 12 will be given by the following equation $$N = (1242 + 450) \div 9 = 188$$

If the station is selected by the operation of the switch $P_1$ in the station selecting switch 20 in conjunction with the memory 18, 188 ($=N$) should be stored at the place indicated by the address corresponding to the switch $P_1$. The number offset by the intermediate frequency of 450 KHz (50×9 KHz), that is, 138 is produced on the signal path d. In this condition, the frequency indicator 16 indicates 1242 KHz and the speaker 6 reproduces a voice signal. The assumption is now made that the time correction by the time signal is made at 24 o'clock (midnight) and the present time is ten seconds before twenty-four hours. The level of output S from the correction time detector 23 is "1" for more than one second. Two periods of clock pulses are applied to the point j after this time, that is, until ten seconds past twenty-four hours (midnight), the signal level at the circuit path f remains "1". The time correction will be carried out if the time signal is received during this interval. If the timepiece is incorrect by more than ten seconds, since the time signal is not received, the time correction by the time signal is not carried out. However, since the accuracy of the quartz type timepiece is high, even if the time correction by the time signal is carried out every day or every week, the error of the timepiece will be below ten seconds at the next correction time. The time signal detector 21 starts the operation when the signal level of the circuit path f becomes "1" at ten seconds before twenty-four o'clock, and the content in the present memory 19 is applied to the signal path e due to the switching function of the switching circuit 34. Then, the content in the preset memory 19 is set in the register 12. For example, when the first program of the Broadcasting Corporation of Japan (NHK) is received, the content of the preset memory 19 is as follows.

$$N = (594 + 450) \div 9 = 116$$

The above indicated number is stored in the register 12. At that moment the receiving station is changed to the station of the Broadcasting Corporation of Japan from a commercial broadcasting station. The level of the output h of the time signal detector 21 becomes "1" when the time signal is detected, the output i of the time correction circuit 22 becomes "1". At this time, although the frequency dividing circuit 27 and the second counter 28 are reset, due to the function of counting 30 and higher fractions as a unit and dropping the rest in the second counter 28, the timepiece is set at zero minute and zero second past zero o'clock even if it is some seconds before twenty-four o'clock or some seconds past zero o'clock. After an interval of about twenty seconds (depending on the rest timing) from the time when the level of the circuit path f becomes "1", the level of the circuit path f becomes "0" again. Then, the content of the preset memory 18 appears at the point e due to the operation of the switching circuit 34. The content of the output of the preset memory 18 is 188 (=N), and this condition is the condition during the time before the signal level of "1" appears on the circuit path f. Therefore, 188 (=N) is set in the register 12 to exchange the station of the Broadcasting Corporation of Japan to the former commercial broadcasting station. The operation of the time signal detector 21 is inhibited. Supply of power to the receiving circuit is stopped when the switch SW in the power source 33 is opened.

The features of the present invention are as follows:

(1) The time correction by the time signal is carried out with certainty by receiving the station of the Broadcasting corporation of Japan.

(2) Due to a radio-timepiece, correct time is kept, and error in the time accuracy is hardly produced. Therefore, in the timepiece radio, any difference between the time indicated by the timepiece and the time signal from the radio set can be removed.

(3) Employing the frequency synthesizer system has created the possibility of using an integrated circuit in the radio set, so that miniaturization is possible in spite of the complex functions.

What is claimed is:

1. An electronic timepiece radio comprising: an electronic timepiece circuit including a standard signal oscillator, a time counting circuit and means for displaying a time determined by the count of the time counting circuit; a radio receiver circuit including a tuning circuit, station selecting means for selecting different broadcast station frequencies, detecting means for detecting received signals applied from said tuning circuit, and means for producing audible frequency signals in response to the output of said detecting means; a correction time detector connected to said time counting circuit for detecting when time correction is to occur and for developing an output signal to indicate detection; time correcting means for detecting a time signal from said detecting means and correcting the time displayed by said timepiece circuit in response to the output of said correction time detector; preset memory means for storing contents representative of at least two broadcasting station frequencies and responsive to the operation of said station selecting means; and switching means for changing from one broadcasting station to a specified station capable of producing said time signal in response to the output of said correction time detector.

2. An electronic timepiece radio claimed in claim 1, wherein said correction time detector is effective to automatically set the frequency of the specified station a little before time correction by a time signal is carried out upon the receiving of the time signal.

3. An electronic timepiece radio claimed in claim 2, wherein said switching means is effective to automatically set the receiving frequency to the frequency which was set before the frequency of the specific station was set when the receiving of the specific station for time correction has finished.

4. An electronic timepiece radio as claimed in claim 1, comprising a frequency synthesizer used as a local oscillator of the radio receiver circuit.

5. An electronic timepiece radio as claimed in claim 1, wherein, at least said preset memory of the receiver circuit and the timepiece circuit are C-MOS integrated circuits.

* * * * *